United States Patent [19]
Baker et al.

[11] Patent Number: 5,492,417
[45] Date of Patent: Feb. 20, 1996

[54] BEARING AND DRIVE ASSEMBLY WITH COMBINED WHEEL SPEED SENSOR

[75] Inventors: Steven F. Baker, Bellevue; Edward R. Clark, Monroeville; Robert P. Tussey, Milan, all of Ohio

[73] Assignee: General Motors Corporation, Detroit, Mich.

[21] Appl. No.: 305,532

[22] Filed: Sep. 14, 1994

[51] Int. Cl.⁶ ................................................. F16C 19/36
[52] U.S. Cl. ..................... 384/448; 384/539; 384/544
[58] Field of Search ........................... 384/448, 446, 384/539, 512, 543, 485, 544

[56] References Cited

U.S. PATENT DOCUMENTS

| | | | |
|---|---|---|---|
| 3,809,177 | 5/1974 | Pirochta | 384/485 |
| 4,179,167 | 12/1979 | Lura et al. | 308/189 A |
| 4,378,858 | 4/1983 | Goft et al. | 180/259 |
| 4,509,099 | 3/1985 | Miki et al. | 384/543 |
| 4,883,373 | 11/1989 | Rieke | 384/539 |
| 4,978,234 | 12/1990 | Ouchi | 384/448 |
| 4,988,220 | 1/1991 | Christiansen et al. | 384/448 |
| 5,010,290 | 4/1991 | Foster | 324/173 |
| 5,141,088 | 8/1992 | Kurihara et al. | 384/512 |
| 5,143,458 | 9/1992 | Alff et al. | 384/448 |

*Primary Examiner*—Lenard A. Footland
*Attorney, Agent, or Firm*—Patrick M. Griffin

[57] ABSTRACT

A powered wheel bearing has a solid spindle supported within a stationary hub by two rows of bearing balls. The innermost ball row has a separable race that is fixed in place by an abutting keeper ring that sits in an adjacent groove. The keeper ring, in turn, is prevented from dislodging by an overlaying shoulder on the sleeve of a CV joint that fits over the end of the spindle with interengaging splines. The joint sleeve is fixed to the spindle by an internal snap ring, so the motion of inserting the sleeve over the spindle is all that is necessary, both for attachment and alignment. The outside of the sleeve also carries regular teeth that provide the encoder ring for a speed sensor.

3 Claims, 2 Drawing Sheets

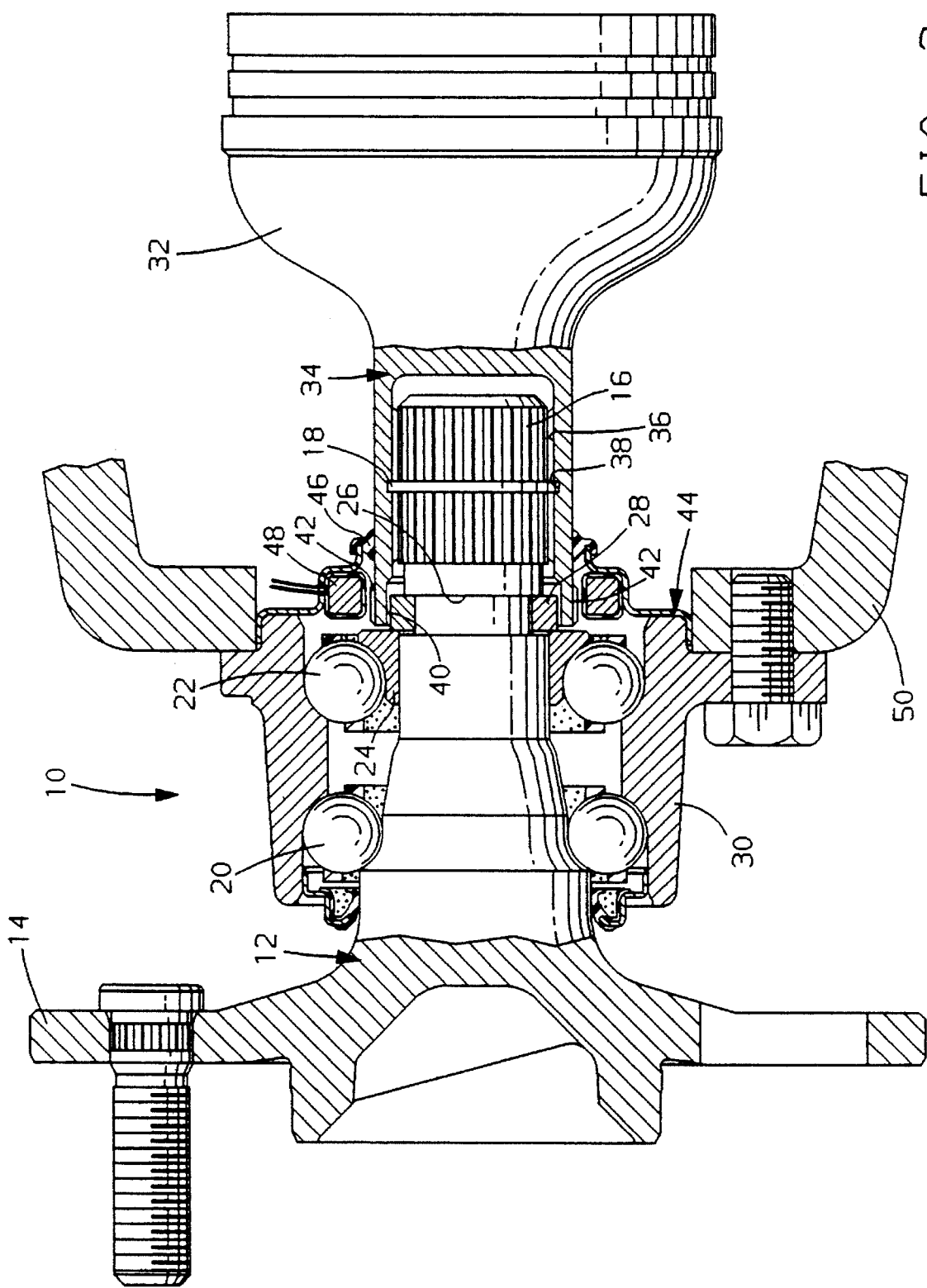

BEARING AND DRIVE ASSEMBLY WITH COMBINED WHEEL SPEED SENSOR

This invention relates to bearing assemblies in general, and specifically the wheel bearing and drive assemblies combined with wheel speed sensors of the type that may be classified in U.S. Cl. 384/448.

BACKGROUND OF THE INVENTION

A commonly used wheel bearing design for the last fifteen years, the so called Generation III design, combines wheel mount, suspension mount and bearing races to the greatest extent possible into a unitized package that is simply bolted on in the assembly line. An example may be seen in U.S. Pat. No. 4,179,167 to Lura et al, commonly assigned. The design disclosed there is a non driven, trailing bearing, with an inner, wheel mounting spindle and a coaxial outer, suspension mounted hub. Since the spindle is non driven, it need not be attached to anything but the wheel, and it is basically just a short, solid shaft with a stub end that extends through the hub. Two rows of bearing balls running on angular contact pathways support the spindle within the hub. In order to maximize the ball count in the axially innermost ball row, a separable race piece incorporating the inner ball pathway is inserted over the stub end of the spindle and against the ball inner ball row after the inner ball row has been installed. The separable race piece is axially adjacent to a groove machined into the spindle stub end. A keeper ring of the proper width to maintain preload on the race piece is wedged radially into the groove, in abutment with the race piece. Then, a swage ring is roll formed around the outside of the keeper ring to hold it into the groove. When a bearing of this type is used in a vehicle with an ABS system, the typical arrangement is to simply press fit a toothed ring over the swage ring, and install a magnetic sensor through the seal end cap, to give a completely sealed device. Such a design is shown in FIG. 9 of U.S. Pat. No. 4,978,234 to Ouchi.

It is also known to use the same basic wheel bearing design with a driven or powered wheel. In that case, the spindle is not solid, but has a central bore that is splined to receive matching splines on a shaft that protrudes from the housing of a constant velocity joint. The shaft is bolted to the spindle. The bolting operation can also serve to set the preload in the bearing when a Generation II type bearing is used, in which all the races are separable. An example of such an arrangement is disclosed in U.S. Pat. No. 5,143,458, which also shows a wheel speed sensor. The sensor assembly, including the toothed wheel called an encoder ring, are attached independently of the manner in which the wheel bearing and the constant velocity joint are assembled, in a bolt on fashion with little or no cooperation between the various structural elements.

An example of a Generation III type bearing used with a powered wheel is disclosed in both coassigned U.S. Pat. Nos. 5,010,290 and 4,998,220. In each design, there is more integration of components than is shown in FIG. 9 of U.S. Pat. No. 4,978,234. As disclosed, the swage ring and encoder ring are integrated into one component, serving both to hold the keeper ring against being dislodged from its groove, as well as providing the regular teeth that create a wheel speed signal. With each design, the shaft from the CV, not illustrated in those patents, is still installed as is shown in U.S. Pat. No. 5,143,458, with the exception that the shaft attachment bolt does not also set bearing preload in a Generation III design. It would be an advantage to integrate more of the various bearing, drive and speed sensor functions into fewer components and fewer assembly operations, if possible.

SUMMARY OF THE INVENTION

The invention provides a combined powered wheel bearing and drive assembly that does incorporate more of the various functions described above into fewer components.

In the embodiment disclosed, a Generation III bearing of the general type described above is used for a driven wheel, but with a solid spindle, similar to the non driven design described above. The end of the spindle, which protrudes axially beyond the separable race and its axially adjacent keeper ring groove, is splined, so that it can serve as torque transmission surface. The center of the splined stub end contains a radially resilient snap ring that stands proud of the splines.

The CV (constant velocity) joint housing, instead of a protruding solid shaft, has a protruding hollow sleeve that can be axially inserted over, not through, the spindle. The inner surface of the CV joint sleeve is splined to mate with the splines on the spindle, and has a central groove adapted to receive the resilient snap ring, and which thereby establishes an installed position of the sleeve relative to the spindle. The edge of the sleeve, in the installed position, has an inner surface that radially overlaps the keeper ring closely enough to prevent it from dislodging from its groove, but which clears the separable race. The outer surface of the end of the sleeve is machined with regular teeth suitable to provide the encoder ring for a speed sensor.

To assemble, the separable race piece is inserted over the splined stub shaft to an operative position, where it is loaded against its ball row, axially adjacent to the keeper ring groove. Then, a keeper ring with an axial thickness suitable to set the proper preload is pushed radially into the keeper ring groove. Instead of adding a swage ring or other separate component to hold the keeper ring in its groove, the sleeve of the CV joint is simply axially inserted over the stub shaft until the snap ring seats. That operation alone, without the addition of a nut or other fastener, provides both a retainer for the keeper ring, and an encoder for wheel speed sensing. A sensor facing the encoder ring is incorporated in a seal that also rides on the outer surface of the sleeve.

DESCRIPTION OF THE PREFERRED EMBODIMENT

These and other objects and features of the invention will appear from the following written description, and from the drawings, in which:

BRIEF DESCRIPTION OF THE DRAWINGS

FIG. 2 shows the installation completed.

Figure 1:
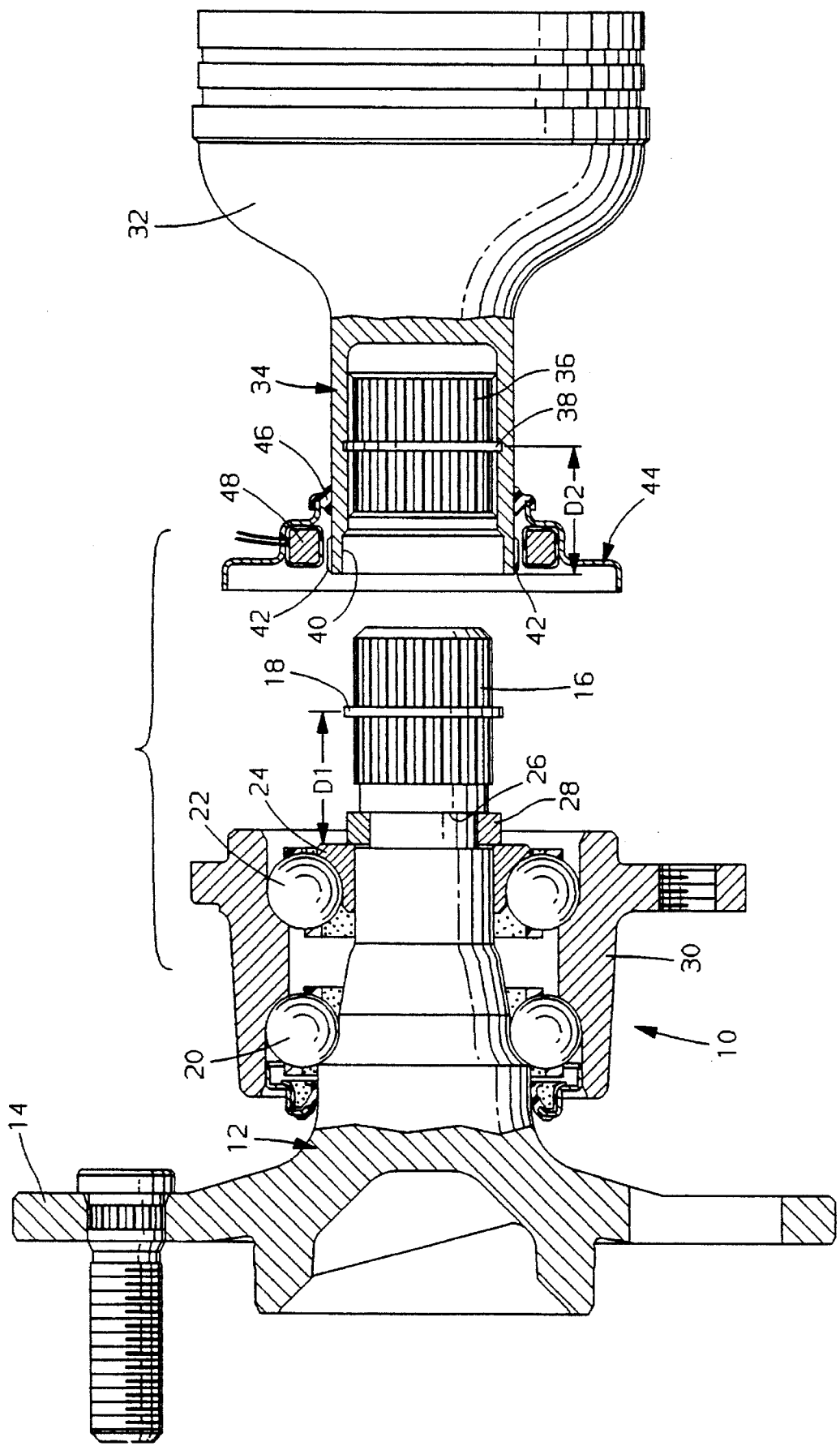
FIG. 1 is a view showing portions of a vehicle wheel bearing and drive according to the invention, with the bearing completed, but before the CV joint has been installed to the bearing.

Referring first to FIG. 1, a Generation III type wheel bearing, indicated generally at 10, is manufactured and assembled according to U.S. Pat. No. 4,719,167 described above. A solid steel inner spindle 12 has a wheel mounting flange 14 at its outer end and, at its axial inner end, is machined with a series of regular, robust splines 16. This represents the main difference from the wheel bearing in the cited patent, in that typically only a trailing, non powered wheel bearing has a solid spindle, the end of which is smooth and serves no particular function. The splines 16 are cut at their center by an annular groove, which is non visible in the figure because it is filled by a radially resilient, internal snap ring 18. Snap ring 18 stands radially above the splines 16, but can be squeezed radially down into its groove. Two rows of angular contact bearing balls run on spindle 12, an outer row 20 that runs directly on spindle 12 and an inner row 22 that runs instead on a separable race 24. Separable race 24 sits axially adjacent to an annular keeper ring groove 26, in its operative, installed position. Race 24 is maintained in its proper, operative position, and under the proper preload against its ball row 22, by a keeper ring 28 that sits in groove 26, tightly against the face of race 24. Keeper ring 28 is actually two mating half rings that are pushed radially into the groove 26. Ring 28 is chosen from a pre sorted collection of graded thicknesses to have the proper axial thickness to preload race 24, thereby accounting for any manufacturing tolerances in the other mating components. Because of their relative diameters, race 24 would be inserted over the splines 16 and into its operative position before snap ring 18 was installed. In it's operative position, the face of race 24 is axially spaced from snap ring 18 by a fixed distance D1. Once the proper preload is achieved, the two ball rows 20 and 22 support spindle 12 for rotation within a cylindrical hub 30, which is stationary. At the point shown in FIG. 1, wheel bearing 10 is complete, but for a structure to prevent keeper ring 28 from being radially dislodged from its groove 26 in operation, which is incorporated into the mechanism that drives bearing 10, described next.

Still referring to FIG. 1, the drive mechanism is a constant velocity joint, indicated generally at 32, which is operatively associated with a vehicle engine and transmission, not illustrated. Ultimately, torque is transmitted to joint 32, and so to an integral, hollow sleeve 34 that protrudes axially from joint 32. Again, it will be recalled that the typical arrangement for a powered wheel bearing is a solid shaft protruding from the joint, not a hollow sleeve. The inner surface of sleeve 34 is machined with a series of splines 36 that complement the spindle splines 16. The sleeve splines 36 are cut centrally by a groove 38 which is sized so as to closely receive snap ring 18 in its expanded condition. Sleeve 34 terminates at a cylindrical shoulder 40, which has a diameter larger than the rest of sleeve 34, and just slightly larger than the diameter of the keeper ring 28. The terminal edge of shoulder 40 is spaced from groove 38 by a distance D2 that is just less than D1. The outer surface of shoulder 40 is machined with a series of regular teeth 42. A seal case 44 with a lip 46 that rides on the outer surface of sleeve 34 contains a circumferential, magnetic reluctance type of wheel speed sensor 48, with a diameter just larger than the teeth 42. The case 44 is adapted to fit tightly to hub 30. The various relative dimensions of the components described thus far allows for a very simple final assembly and installation, described next.

Referring next to FIG. 2, bearing 10 is assembled to CV joint 32 simply by axially inserting sleeve 34 over spindle 12, which interfits the complementary splines 16 and 36, establishing a driving connection that turns spindle 12 at the same speed as sleeve 34. As the two are pushed farther together, the snap ring 18 is compressed radially within the sleeve splines 36 until it finally springs out into the groove 38, establishing an installed position that is easily sensed by the assembler. The seal case 44 is pressed tightly to the hub 30, which is ultimately bolted to a vehicle suspension 50, so it and seal case 44 become stationary and axially fixed. CV joint 32 is securely mounted to the rest of the vehicle drive train. Therefore, snap ring 18, while not as axially rigid as a threaded nut, need not resist a great deal of axial pull apart force in operation. Furthermore, while a snap ring and groove is not inherently as axially solid as a nut and threaded shaft, it is more than adequate here, since the relationship of D1 to D2 assures that the edge of sleeve shoulder 40 does not abut the face of race 24. That is not necessary, since the axial retention and preload of race 24 is provided by keeper ring 28. However, the radial overlap of shoulder 40 with keeper ring 28 does prevent it from dislodging from its groove 26, and so plays a direct role in the ultimate retention of race 24. The radial, concentric alignment of spindle 12 and sleeve 34 is not a function of the snap ring 18, but rather of the precision with which hub 30 is aligned with the rest of the drive train. Even so, some radial play between CV joint 32 and spindle 12 can be tolerated, as well, since shoulder 40 need not radially abut keeper ring 28 so long is it overlie it with less radial clearance than the depth of groove 26. The same D1, $D_2$ relationship also assures that the teeth 42 axially register with the installed speed sensor 48. And, again, some axial play can be tolerated, so long as there is sufficient axial overlap.

In conclusion, the number of components is reduced considerably, since the sleeve 34, besides torque transmission, provides the last link in the structural integrity of the bearing 10 as well as providing the rotating wheel speed sensing ring, and a seal surface. Alignment and location occur automatically and passively simply from the axial insertion of sleeve 34 over spindle 12, thus eliminating the threaded nut or any other separate fastener and attachment operation. Disassembly is simplified, as well, since an impact blow will compress snap ring 18 and part joint 32 from bearing 10 (after they are otherwise detached from the vehicle), without significant damage. And, of course, snap ring 18 could always be easily replaced for reassembly, if necessary. Even if wheel speed sensing were not needed, all assembly and installation steps would remain the same, except that the sensor 48 would be eliminated from the seal case 44. The sleeve 34 would still perform all its other functions, and the teeth 42 would simply be redundant, but non interfering. Other surfaces capable of fitting non turnably together so as to transmit torque could be used, though interfitting splines are the most common. Some fastener other than the snap ring 18 could be used, such as a spring loaded plunger or key, so long as it created the same positive, easily sensed engagement based upon axial insertion alone, and provided the same axial alignment feature of sleeve 34 with spindle 12 upon engagement. If such a fastener provided sufficient axial rigidity between sleeve 34 and spindle 12, then it is conceivable that the edge of shoulder 40 could directly abut the race 24, and prevent its withdrawal. Therefore, it will be understood that it is not intended to limit the invention to just the embodiment disclosed.

The embodiments of the invention in which an exclusive property or privilege are claimed are defined as follows:

1. A combined powered wheel bearing and drive assembly, comprising, a wheel bearing having a rotatable, wheel mounting member and a concentric, stationary, vehicle mounted member, said wheel mounting member having an axially protruding torque transmission surface, a separable bearing race axially insertable freely over said torque transmission surface to an operative position on said wheel mounting member, a powered drive member having a sleeve axially insertable over said male torque transmission surface to an installed position so as to drivingly interengage therewith, said sleeve having a terminal axial edge located so as to prevent axial withdrawal of said separable bearing race from its operative position when said sleeve is in its installed position, and, fastener means passively engageable between said bearing wheel mounting member and said sleeve upon axial insertion of said sleeve over said torque transmission surface to maintain said installed position, whereby axial insertion of said sleeve alone acts both to retain said drive member and wheel bearing together as well as to maintain said bearing race in operative position.

2. A combined powered wheel bearing and drive assembly, comprising, a wheel bearing having a rotatable, wheel mounting member and a concentric, stationary, vehicle mounted member, said wheel mounting member having an axially protruding torque transmission surface and an annular groove axially inboard of said torque transmission surface, a separable bearing race axially insertable freely over said torque transmission surface to an operative position on said wheel mounting member axially adjacent to said annular groove, a keeper ring radially insertable into said groove so as to axially abut said bearing race and maintain it in operative position, a powered drive member having a sleeve axially insertable over said torque transmission surface to an installed position so as to drivingly interengage therewith, said sleeve having a cylindrical terminal shoulder with an inner surface sized so as to closely radially overlap said keeper ring and thereby maintain it in place when said sleeve is in its installed position, and, fastener means passively engageable between said torque transmission surface and said female sleeve upon axial insertion of said sleeve over said torque transmission surface to maintain said installed position, whereby axial insertion of said sleeve alone acts both to retain said drive member and wheel bearing together as well as to maintain said bearing race in operativee position.

3. A combined powered wheel bearing, wheel speed sensor, and drive assembly, comprising, a wheel bearing having a rotatable, wheel mounting spindle and a concentric, stationary, vehicle mounted hub, said spindle having an axially protruding torque transmission surface and an annular groove axially inboard of said torque transmission surface, a separable bearing race axially insertable freely over said spindle to an operative position on said spindle axially adjacent to said annular groove, a keeper ring radially insertable into said groove so as to axially abut said bearing race and maintain it in operative position, a powered drive member having a sleeve axially insertable over said torque transmission surface to an installed position so as to drivingly interengage therewith, said sleeve having a cylindrical shoulder with an inner surface located so as to closely radially overlap said keeper ring and thereby maintain it in place when said sleeve is in its installed position, said cylindrical shoulder further including a regular series of teeth on its outer surface, fastener means passively engageable between said spindle and said female sleeve upon axial insertion of said sleeve over said torque transmission surface to maintain said installed position, and, a speed sensor located in proximity to said teeth, whereby axial insertion of said sleeve alone acts both to retain said drive member and wheel bearing together as well as to maintain said bearing race in operative position, after which rotation of said drive member one to one with said wheel bearing provides a wheel speed signal to said sensor.

* * * * *